United States Patent [19]
Guess et al.

[11] Patent Number: 5,477,699
[45] Date of Patent: Dec. 26, 1995

[54] EVAPORATOR FAN CONTROL FOR A REFRIGERATOR

[75] Inventors: Ronald W. Guess; Lori A. Cook, both of Scott Township, Vanderburgh County; Stephen G. Williams, Ohio Township, Warrick County; Greg A. Bradley, Knight Township, Vanderburgh County, all of Ind.

[73] Assignee: Whirlpool Corporation, Benton Harbor, Mich.

[21] Appl. No.: 342,932

[22] Filed: Nov. 21, 1994

[51] Int. Cl.⁶ .................................................. F25D 17/06
[52] U.S. Cl. ................................................ 62/187; 62/213
[58] Field of Search .......................... 62/187, 208, 213

[56] References Cited

U.S. PATENT DOCUMENTS

| | | | |
|---|---|---|---|
| 2,997,857 | 8/1961 | Clark | 62/213 X |
| 3,107,502 | 10/1963 | Herndon, Jr. et al. | 62/180 |
| 3,611,741 | 10/1971 | Linstromberg | 62/137 |
| 4,282,720 | 8/1981 | Stottmann et al. | 62/180 |
| 4,688,393 | 8/1987 | Linstromberg et al. | 62/187 |
| 4,732,010 | 3/1988 | Linstromberg et al. | 62/187 |
| 4,819,442 | 4/1989 | Sepso et al. | 62/187 |
| 4,843,833 | 7/1989 | Polkinghorne | 62/180 |
| 4,924,680 | 5/1990 | Janke et al. | 62/187 |

*Primary Examiner*—William E. Tapolcai
*Attorney, Agent, or Firm*—Thomas J. Roth; Joel M. van Winkle

[57] ABSTRACT

A refrigerator having a cabinet defining a first compartment and a second compartment separated from each other by a divider wall wherein the divider wall has an air passage for communicating between the first and second compartments. The refrigerator further includes an evaporator disposed in the first compartment, a compressor fluidly connected with the evaporator for moving refrigerant therethrough, and an evaporator fan for moving air over the evaporator. A first thermostat senses temperature within the first compartment and a second thermostat senses temperature within the second compartment. An evaporator fan and baffle control system is provided including a baffle disposed within the air passage and being positionable in an open or closed position for selectively opening and closing the air passage. A switch is operatively associated with the baffle for connecting the first thermostat and the evaporator fan in series with a power supply when the baffle is in the closed position and for further connecting the second thermostat and the evaporator fan in series with the power supply when the baffle is in the open position. The baffle control system includes a cam driven by a baffle motor wherein the cam is coupled to a baffle for moving the baffle between an open and closed position. A plurality of switches, operated by the cam, are provided for controlling the energization of the motor such that the baffle is opened when the fresh food compartment requires cooling and the baffle is closed when the fresh food compartment does not require cooling.

18 Claims, 6 Drawing Sheets

EVAPORATOR FAN CONTROL FOR A REFRIGERATOR

BACKGROUND OF THE INVENTION

This invention relates generally to refrigerator air circulation systems and more particularly to an improved air circulation system for independently controlling the operation of an evaporator fan based on the status of either the fresh food compartment or the freezer compartment of a refrigerator.

Conventional dual compartment refrigerators of the forced air circulation type utilize a single evaporator and an evaporator fan for cooling a freezer compartment thereof. The freezer compartment is coupled by a plurality of air passages through a divider wall to a fresh food compartment. An air baffle is located within the fresh food compartment air inlet passage wherein the baffle is operable to control the passage of refrigerated air into the fresh food compartment.

Typically, the operation of the compressor and evaporator fan is controlled by a single thermostat which may be positioned in either the fresh food compartment or the freezer compartment. When the thermostat calls for additional cooling, the evaporator fan, a compressor and a condenser fan are all energized.

It has been found desirable, however, to provide a refrigerator having a fresh food compartment and a freezer compartment wherein the respective compartments are cooled independently from each other. In this configuration, independent operation of the evaporator fan is desired such that the evaporator fan may be energized in response to either the fresh food compartment temperature or the freezer compartment temperature. Further, in this type of refrigerator configuration, it is desirable to selectively operate the baffle to only allow air flow into the fresh food compartment when cooling thereof is required.

U.S. Pat. No. 4,819,442, to Sepso et al., discloses a refrigerator system wherein a temperature sensing unit is interconnected with a baffle to control the position of the baffle in relation to the temperature sensed by the temperature sensing unit. A switch is operatively associated with the baffle for causing a fan to operate only when the valve member is in a certain open position. This system, however, provides no teaching for operating the evaporator fan when either a fresh food compartment or a freezer compartment is calling for cooling. Further, this system is relatively complicated and expensive.

U.S. Pat. No. 4,843,833, to Polkinghorne, discloses a refrigerator having an electronic control receiving inputs from temperature sensors disposed in the freezer compartment and fresh food compartment, respectively. When the freezer is detected to have a temperature exceeding a high temperature limit, the control operates to energize the compressor and evaporator fan. The control further operates to open or close a fresh food baffle dependent on the sensed temperature in the fresh food compartment. This system, however, requires relatively expensive electronics and is relatively complicated.

U.S. Pat. No. 4,732,010, to Linstromberg et al., discloses a refrigerator having an electronic control receiving inputs from temperature sensors disposed in the freezer compartment and fresh food compartment. When the temperature in the fresh food compartment is above a desired fresh food temperature limit, the electronic control operates to open a fresh food baffle and energize an evaporator fan. The control further operates to close the baffle when the fresh food compartment is at or below the desired fresh food compartment temperature. When the freezer compartment temperature is above a high temperature limit, the control operates to energize a compressor and the evaporator fan. This system, however, also requires relatively expensive electronics and is relatively complicated.

It would be an improvement in the art, therefore, if a relatively simple system were provided for independently operating to cool a freezer compartment and fresh food compartment. Specifically, it would be an improvement if an electro-mechanical control system were provided for independently operating an evaporator fan and a fresh food baffle for independently controlling the temperatures of a fresh food compartment and freezer compartment.

SUMMARY OF THE INVENTION

Accordingly, one object of the present invention is to provide a refrigeration system for independently cooling a freezer compartment and a fresh food compartment.

Another object is to provide a refrigeration system for controlling the operation of an evaporator fan based on the status of either the fresh food compartment or the freezer compartment.

Still another object of the present invention is to provide a simple electro-mechanical system control system for a refrigerator for independently operating an evaporator fan in response to the status of either the fresh food compartment or the freezer compartment.

Still another object is to provide a refrigerator having an evaporator fan control system having a switch operatively associated with the baffle for controlling the energization of an evaporator fan.

According to the present invention, the foregoing and other objects are attained by a refrigerator having a cabinet defining a first compartment and a second compartment separated from each other by a divider wall wherein the divider wall has an air passage for communicating between the first and second compartments. The refrigerator further includes an evaporator disposed in the first compartment, a compressor fluidly connected with the evaporator for moving refrigerant therethrough, and an evaporator fan for moving air over the evaporator. A first thermostat senses temperature within the first compartment and a second thermostat senses temperature within the second compartment. An evaporator fan and baffle control system is provided including a baffle disposed within the air passage and being positionable in an open or closed position for selectively opening and closing the air passage. A switch is operatively associated with the baffle for connecting the first thermostat and the evaporator fan in series with a power supply when the baffle is in the closed position and for further connecting the second thermostat and the evaporator fan in series with the power supply when the baffle is in the open position.

The baffle control system includes a cam driven by a baffle motor wherein the cam is coupled to a baffle for moving the baffle between an open and closed position. A plurality of switches, operated by the cam, are provided for controlling the energization of the motor such that the baffle is opened when the fresh food thermostat indicates cooling of the fresh food compartment is desired and the baffle is closed when the fresh food compartment does not require cooling.

DETAILED DESCRIPTION OF THE PREFERRED EMBODIMENT

Figure 1:
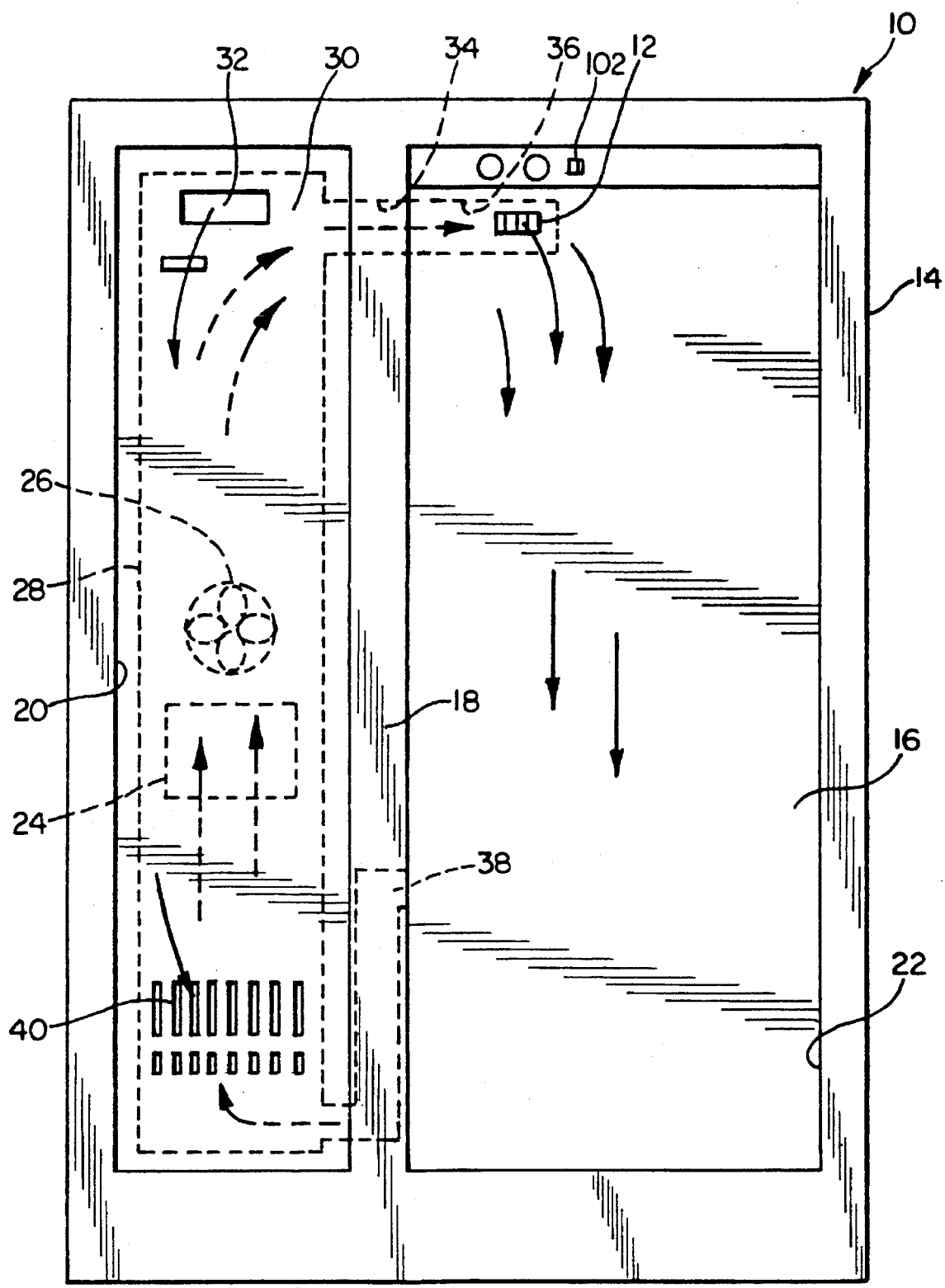
FIG. 1 is a front elevational view of a refrigerator having an air baffle embodying the invention, the compartment doors being omitted to facilitate an illustration of the components therein.

Referring to FIG. 1, a refrigeration apparatus, such as a refrigerator/freezer 10, includes an air baffle 12 according to the present invention. The invention is shown utilized with a side-by-side refrigerator/freezer. However, other types of refrigeration apparatus may be used in conjunction with the air baffle 12 of the present invention, as will be obvious to those skilled in the art.

The refrigerator/freezer 10 includes cabinet 14 housing a conventional liner 16 therein, with suitable insulation provided between the liner 16 and the cabinet 14. The liner 16 includes a plurality of wall portions, as is well known, and may be of one piece construction or of multiple piece construction, as necessary or desired. The refrigerator/freezer 10 includes an insulating separator or divider wall 18 which may utilize the liner wall portions. The cabinet 14, liner 16 and divider wall 18 together define a below-freezing, or freezer, compartment 20 and a fresh food, or above-freezing, compartment 22. Suitable doors (not shown) are provided for selective access to the freezer and fresh food compartments 20 and 22.

The freezer and fresh food compartments 20 and 22 are cooled by circulating refrigerated air therethrough which has been refrigerated as a result of being passed in heat exchange relation with a conventional evaporator 24. An evaporator fan 26 draws air across the evaporator 24 with the cooled air passing through a duct 28 behind a rear wall 30 of the freezer compartment 20 and further through a freezer compartment air inlet 32. The duct 28 is also in communication with a scoop, or passage, 34 in the separator 18. The passage 34 is in communication with an air duct 36 in the upper rear section of the fresh food compartment 22, which duct 36 includes a fresh food compartment air inlet opening (not shown). The selectively positionable baffle 12 overlies the air inlet opening and is operated by a control described below to control the passage of refrigerated air into the fresh food compartment 22. The passage 34, the duct 36 and the opening collectively define an air inlet passageway.

Although the baffle 12 is illustrated overlying the air inlet opening, the baffle 12 could be disposed at various positions within the passage 34 or the duct 36 as is obvious to those skilled in the art.

Refrigerated air that passes through the passage 34 is discharged through air inlets of the baffle 12 to circulate within the fresh food compartment 22 and subsequently return to the freezer duct 28 through a return air outlet duct, or passage 38 located in the separator 14 at the bottom rear of the fresh food compartment 22.

The refrigerated air in the freezer compartment 20 returns to the duct 28 at a freezer compartment air outlet 40 and mixes with the air returned from the fresh food compartment 22. The mixed air is drawn by the evaporator fan 26 across the evaporator 24 during a cooling unit on cycle to remove heat therefrom and recirculate the air in the compartments 20 and 22.

Figure 8:
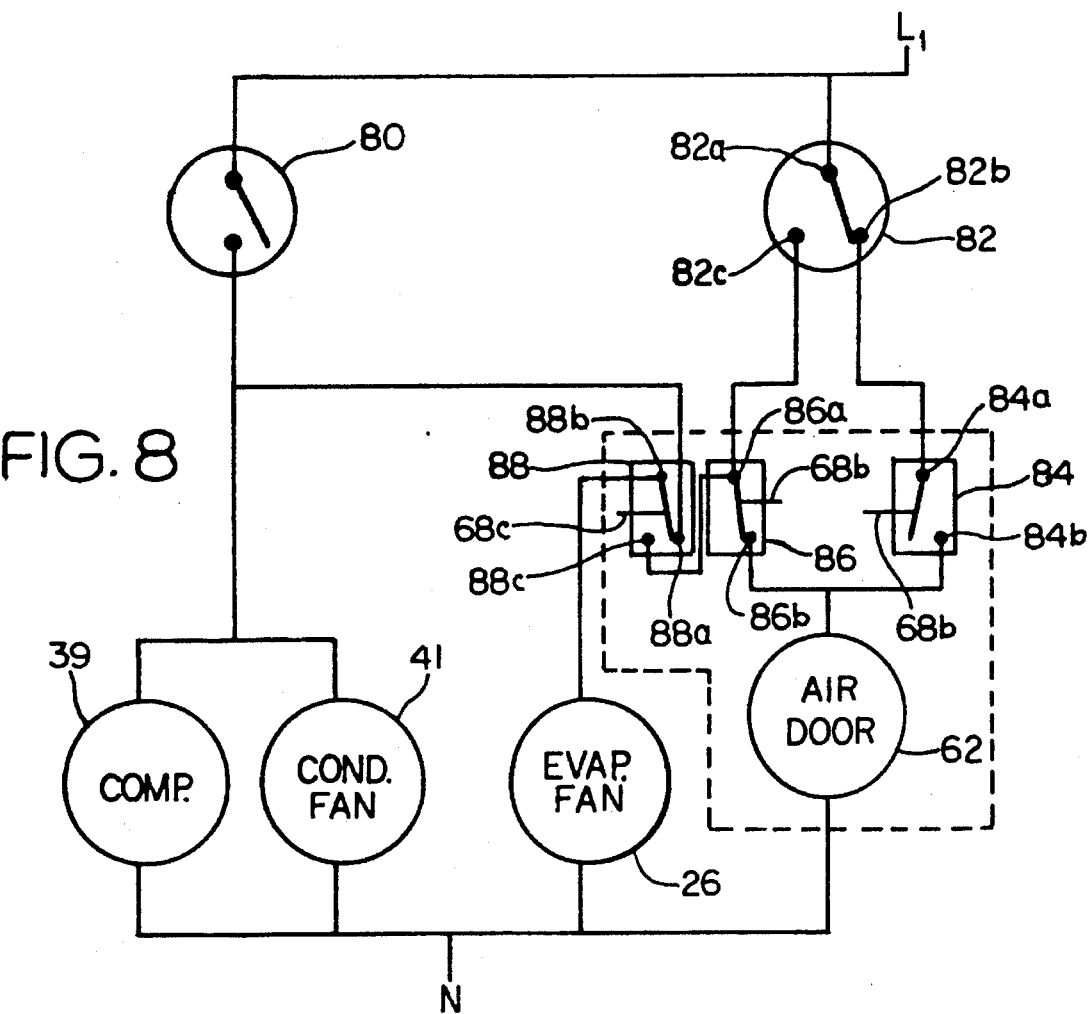
FIG. 8 is an electrical schematic of an evaporator fan and baffle control system of the present invention, wherein the baffle is positioned in a closed position.

In addition to the evaporator 24 and the evaporator fan 26, the refrigeration apparatus 10 includes connected components such as a compressor 39 and a condenser fan 41, shown in FIG. 8, and a condenser and a defrost heater, not shown, as is well known.

Figure 2:
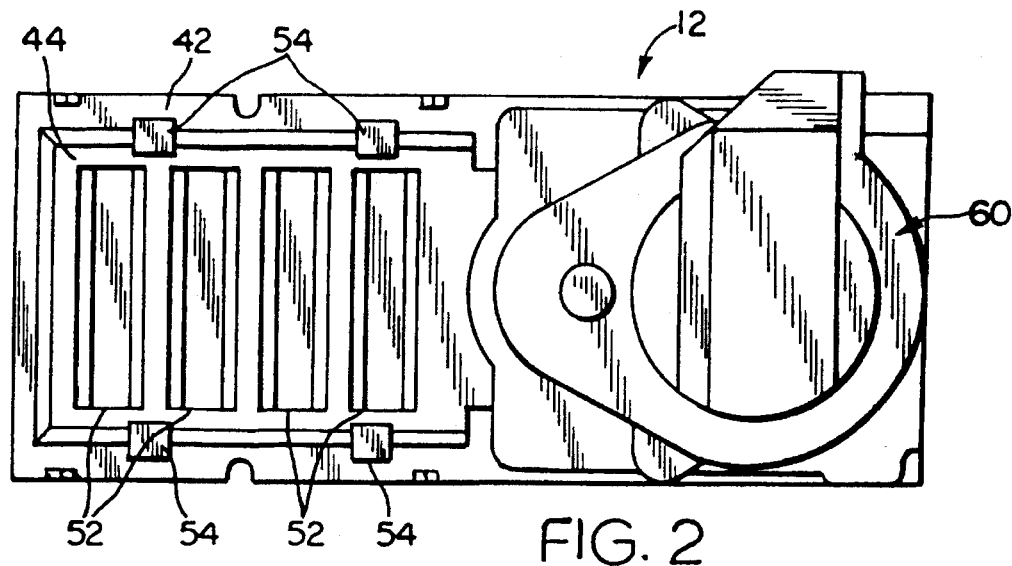
FIG. 2 is an plan view of a baffle system according to the invention.
Figure 3:
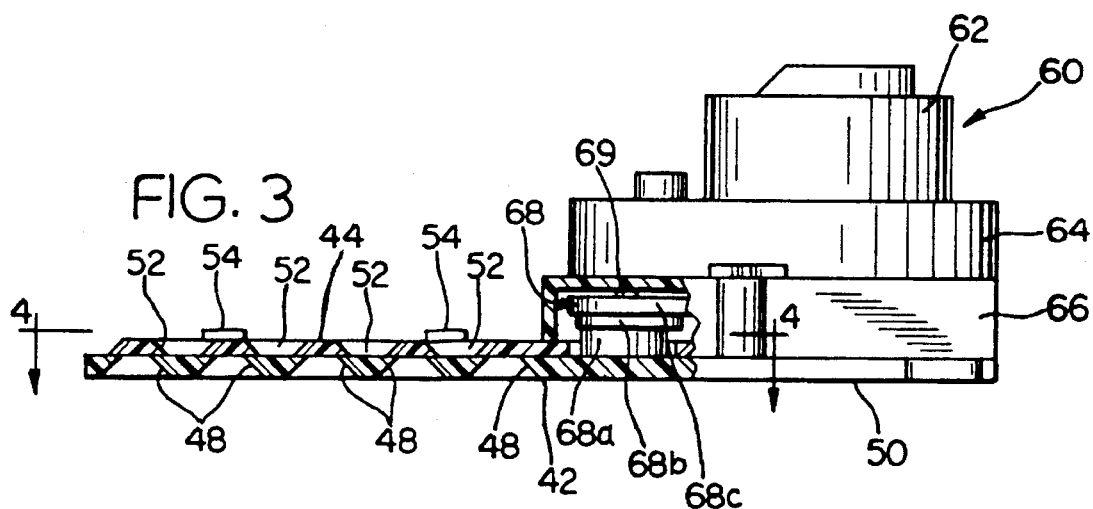
FIG. 3 is a partly cut away side elevational view of the baffle of FIG. 2.

Referring to FIGS. 2 and 3, the baffle 12 can be seen to include a fixed plate 42 and a slide plate 44.

The fixed plate 42 is of one-piece molded plastic construction and is generally rectangular shaped. The fixed plate 42 includes a plurality of longitudinally spaced, laterally extending apertures 48 therethrough. The apertures 48 are provided for enabling refrigerated air to enter the fresh food compartment 22. An actuator mounting end 50 of the fixed plate 42 includes no such apertures 48.

The slide plate 44 is also of generally rectangular construction, but is of smaller size than the fixed plate 42. The slide plate 44 includes a plurality of apertures 52 therethrough corresponding to the apertures 48 in the fixed plate 42.

The slide plate 44 is slidably mounted to the fixed plate 42 permitting straight line reciprocal motion of the slide plate 44 with respect to the fixed plate 42. Specifically, the fixed plate 42 includes a plurality of outwardly extending L-shaped slide members 54 for laterally constraining the slide plate 44 with respect to the fixed plate 42 while allowing longitudinal movement. The L-shaped members 54 are laterally spaced apart a distance slightly greater than the width of the slide plate 44 and define a track within which the movable plate 44 can slide. It can be understood, therefore, that the slide plate 44 is slidably movable relative to the fixed plate 42 between an open position, with its apertures 52 in alignment with the fixed plate apertures 48 to permit refrigerated air to flow into the fresh food compartment, and a closed position wherein the apertures 48 and 52 are in disalignment to prevent the refrigerated air from entering the fresh food compartment 22.

Mounted to the fixed plate 42 is a slide plate drive system 60 including a motor 62, a gear reduction mechanism 64 and a cam 68. The motor is mounted to the gear reduction mechanism which operates in a known manner to reduce the motor speed output. The gear reduction mechanism 64 is mounted to a housing 66 which is mounted to the fixed plate 42. The cam member 68, disposed within the housing 66, is interconnected with the gear reduction drive output 69 and includes a first, second and third control surfaces, 68a, 68b and 68c, respectively.

Figure 4:
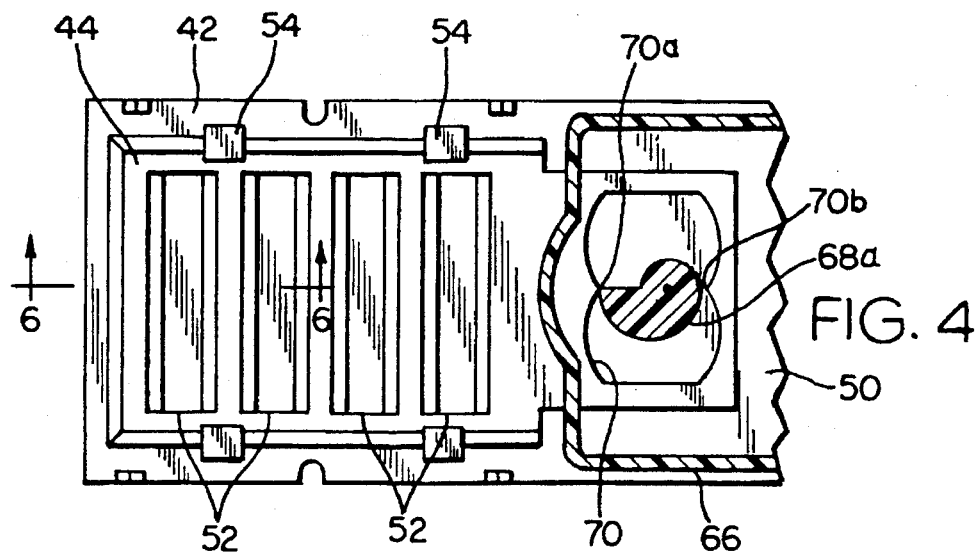
FIG. 4 is a view taken along lines 4—4 of FIG. 3 showing the baffle in a closed position.
Figure 5:
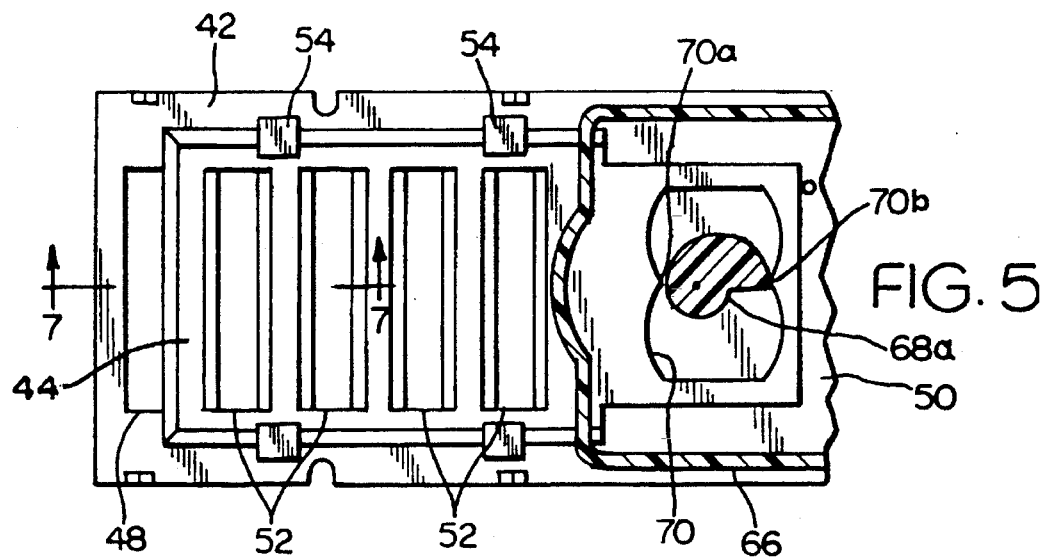
FIG. 5 is a view taken along lines 4—4 of FIG. 3 showing the baffle in an open position.

As shown in FIGS. 4 and 5, the cam 68 operates to drive the slide plate such that the baffle may be selectively positioned in the closed or open position. The first surface 68a of the cam 68 is disposed within a shaped slot 70 provided on slide plate 44. The shaped slot 70 includes a first contact point 70a and a second contact point 70b. In operation, rotation of the cam 68 causes the first control surface 68a to engage either the first or second contact point 70a or 70b, respectively, for moving the slide plate 44 relative to the fixed plate 42. As shown in FIG. 4, the first control surface 68a is positioned such that the slide plate is in a closed position. In FIG. 5, the cam 68 is shown rotated 180 angular degrees from FIG. 4, whereby the first control surface 68a has engaged the second contact point 70b for moving the slide plate 44 to an open position.

Figure 6:
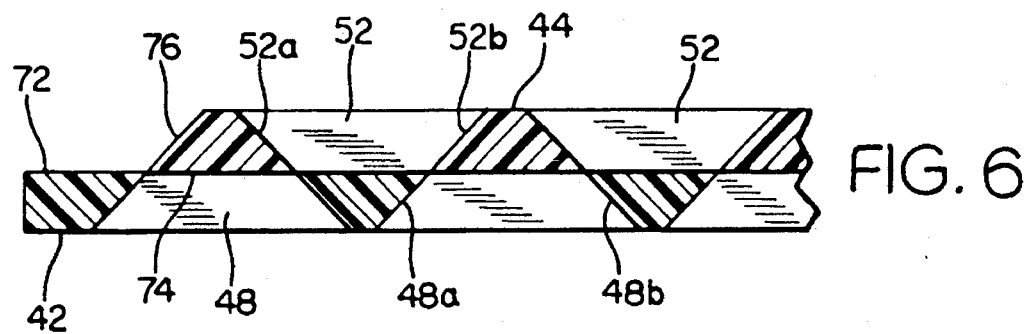
FIG. 6 is an enlarged sectional view taken along lines 6—6 in FIG. 4.
Figure 7:
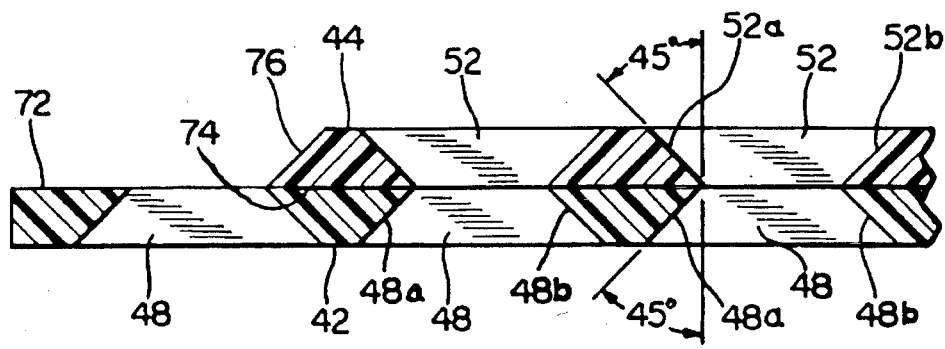
FIG. 7 is an enlarge sectional view taken along lines 7—7 in FIG. 5.

Turning now to FIGS. 6 and 7, details of the fixed plate and the slide plate 44 are shown. As described above, the slide plate 44 is slidably mounted to the fixed plate 42 wherein a top surface 72 of the fixed plate and a bottom surface 74 of the slide plate 44 are slidably disposed adjacent each other. As can be readily understood by one skilled in the art, for the baffle 12 to effectively prevent air flow through the duct 34 when the slide plate 44 is in the closed position, the top surface 72 and the bottom surface 74 must substantially contact each other to provide a seal between the slide plate 44 and fixed plate 42. To this end, the top surface 72 and the bottom surface 74 are preferably flat to within 0.25 mm such that the gap between the two surfaces, 72 and 74, may be limited to no more than 0.15 mm.

This intimate contact between the top surface 72 and the bottom surface 74, however, may contribute to frost forming on the baffle 12 and bridging between the fixed plate 42 and slide plate 44, thereby inhibiting the movement of the slide plate 44 relative to the fixed plate 42. To overcome this problem, the front edge 76 of the slide plate 44 as well as the side edges 52a and 52b of the slide plate apertures 52 and the side edges 48a and 48b of the fixed plate apertures 48 are chamfered such that the respective edges provide a structure for removing frost which may accumulate on the baffle. These edges operate to remove frost in both directions of slide plate movement. Preferably, each of these edges, 76, 52a, 52b, 48a and 48b, respectively, is provided with a 45 degree chamfer such that each edge presents a sharp edge for contacting the facing plate and a 45 degree slope for forcing away frost build up.

In FIGS. 8–11, a unique and simple evaporator fan control system and baffle control system of the present invention are shown. The evaporator control system is such that evaporator fan 26 may be energized when either the fresh food compartment 22 or the freezer compartment 20 require cooling. The baffle door control system is such that when the fresh food compartment requires cooling, the baffle 12 is open. However, when cooling of the fresh food compartment is not required, the baffle 12 is closed.

Turning now to FIG. 8, a freezer thermostat 80 and a fresh food thermostat 82 are shown. As is known, the freezer thermostat 80 senses temperature in the freezer compartment 20 and the fresh food thermostat 82 senses temperature in the fresh food compartment 22.

The freezer thermostat 80 is electrically connected in series with the compressor 39 and the condenser fan 41 such that when the freezer thermostat 80 is closed, indicating that freezer cooling is required, the compressor 39 and condenser fan 41 are energized. The fresh food thermostat is connected in series with the baffle or air door motor 62 through a first switch 84 and a second switch 86 wherein the switches 84 and 86 are connected in parallel. Further, a third switch 88 is provided connected in series between the fresh food thermostat 82 and the evaporator fan 26. The third switch 88 is also connected in series between the freezer thermostat and the evaporator fan 26. All of the switches, 84, 86 and 88 respectively, are operated by the cam 68.

Figure 9:
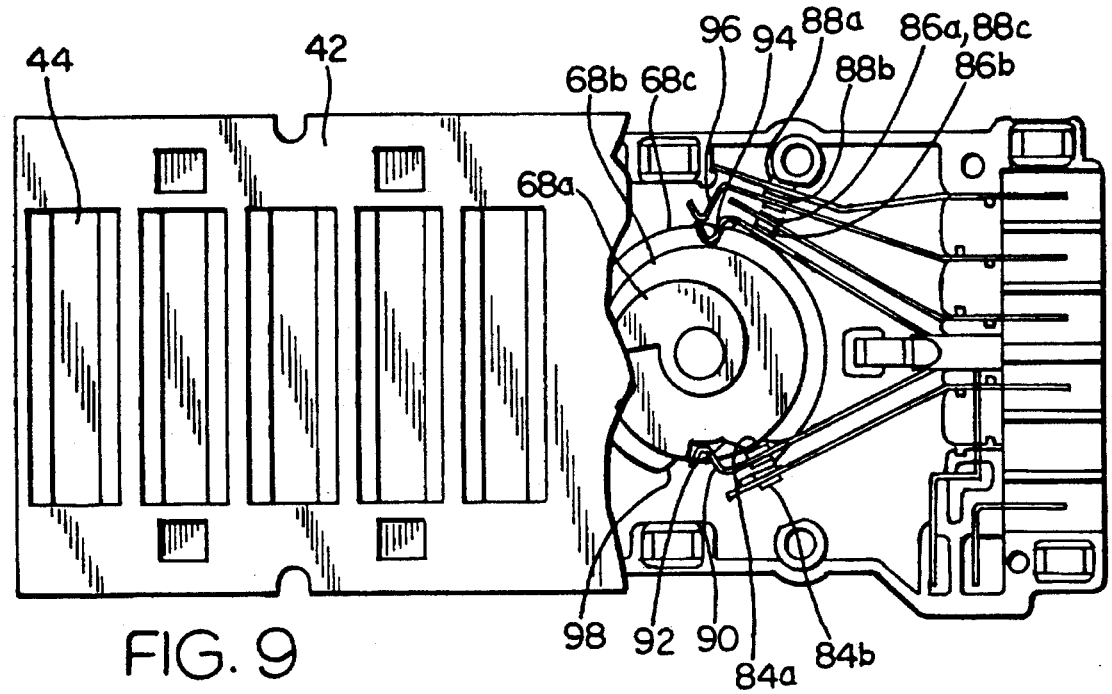
FIG. 9 is a partly cut away bottom elevational view of the baffle of FIG. 2 showing the baffle in a closed position.

In FIG. 9, the switches 84, 86 and 88 are shown assembled within the housing 66. As shown, the second control surface 68b engages a cam follower 90 for selectively operating the first switch 84. The second control surface 68b additionally engages a cam follower 94 for selectively operating the second switch 86. Further, the third control surface 68c engages a cam follower 96 for operating the third switch 88.

During operation, when the fresh food compartment is at or below the desired fresh food temperature, the fresh food thermostat electrical contacts are oriented in a position wherein a current path is provided through the contacts 82a and 82b. When the contacts are oriented in this fashion, the baffle is positioned in a closed position, as shown in FIG. 9. It can be seen that in this condition, the cam follower 90 resides in a recess 92 provided on the second control surface 68b such that the contacts 84a and 84b are not engaged. Additionally, the cam follower 94 is engaged by the second control surface 68b such that switch 86 is closed wherein contacts 86a and 86b are engaged. Still further, the cam follower 96 is positioned by the third control surface 68c such that contacts 88a and 88b are engaged thereby connecting the evaporator fan in series with the freezer thermostat 80.

In the baffle closed condition, therefore, the freezer thermostat 80 controls the operation of the evaporator fan 26, the compressor 39, and the condenser fan 41 responsive to the cooling demands of the freezer compartment 20.

When the temperature in the fresh food compartment 22 rises above the desired fresh food temperature, the fresh food thermostat 82 opens contacts 82a and 82b and closes contacts 82a and 82c. Under this condition, the baffle motor 62 is energized through the second switch 86 which is in the closed position as described above. Energization of the motor 62 causes the cam 68 to rotate, closing the first switch 84 and moving the slide door 44 from a closed toward an open position. As further described above, 180 degree rotation of the cam 68 moves the baffle 12 from a completely closed position to a completely open position. In the completely open position, the recess 92 provided on the second control surface 68b operates to open the second switch 86, thereby deenergizing the motor 62. Further, the third control surface drives the third switch 88 to close contacts 88c and 88b wherein the evaporator fan 26 is energized through the fresh food thermostat 82.

Figure 10:
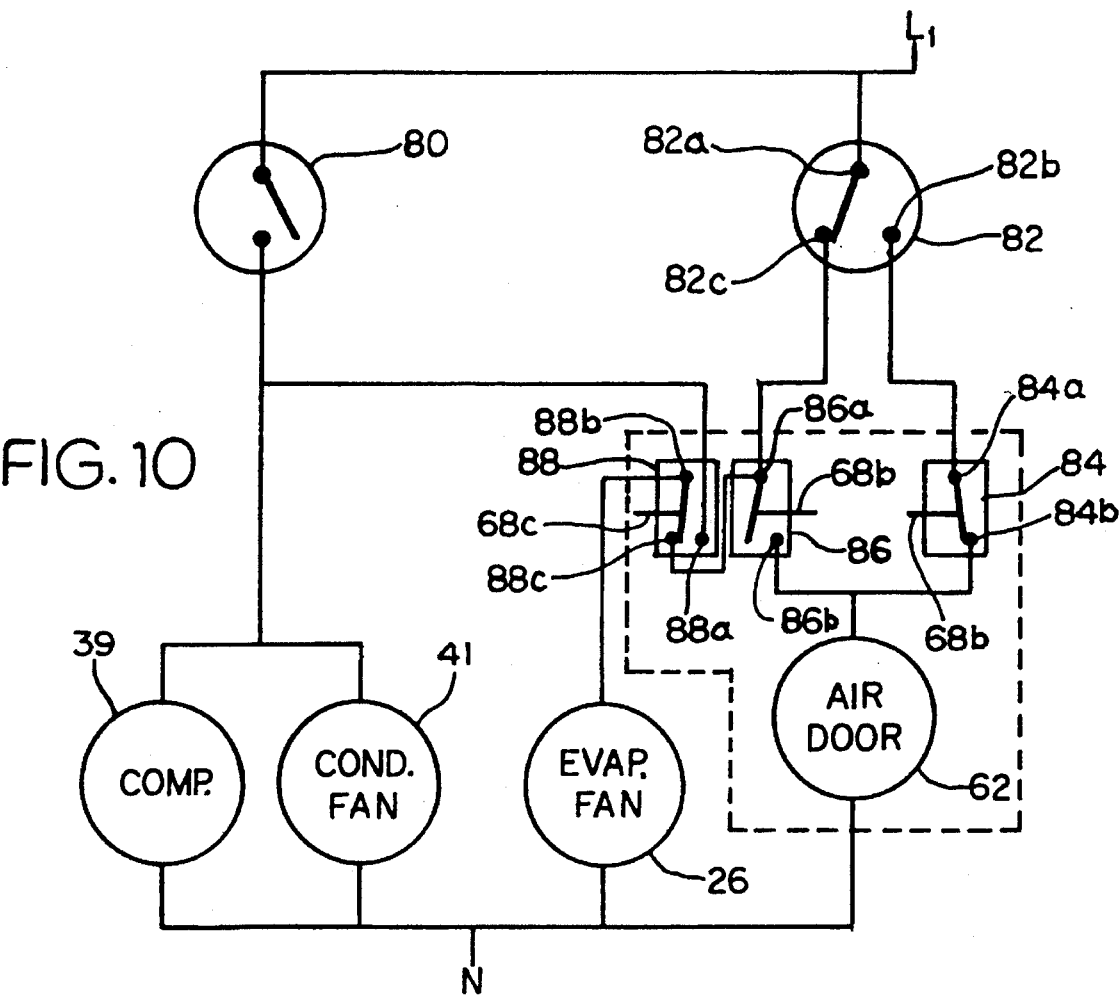
FIG. 10 is an electrical schematic of a evaporator fan and baffle control system of the present invention, wherein the baffle is positioned in an open position.
Figure 11:
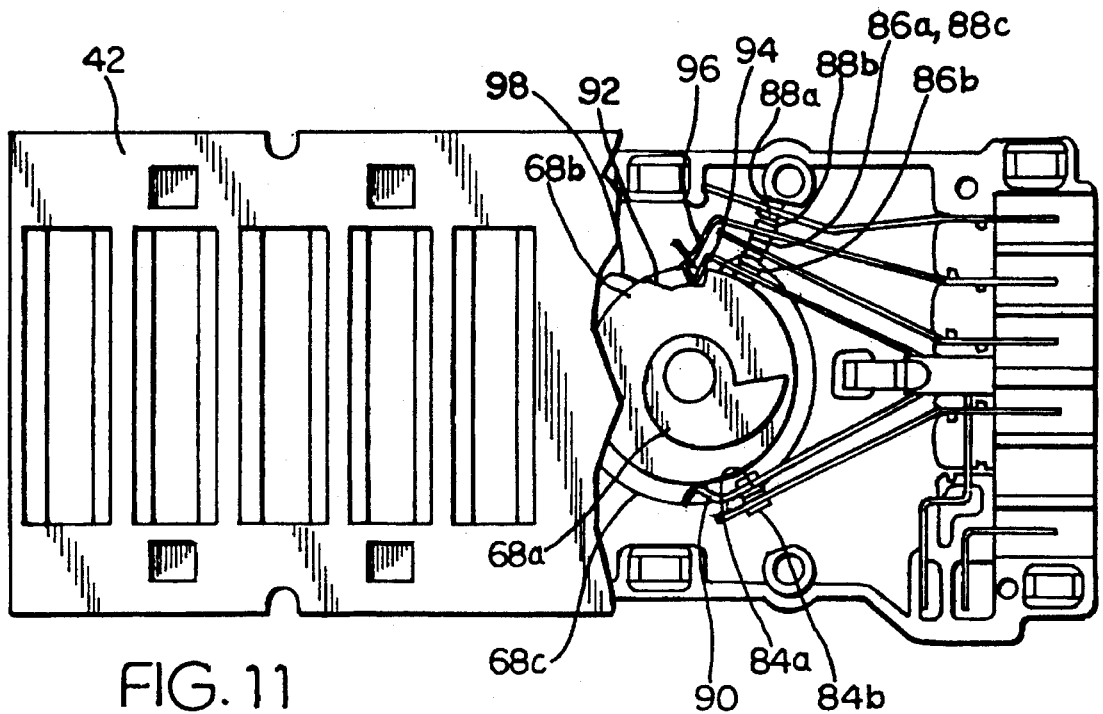
FIG. 11 is a partly cut away bottom elevational view of the baffle of FIG. 2 showing the baffle in an open position.

FIGS. 10 and 11, illustrate the switch configuration when the fresh food compartment 22 is calling for cooling and the baffle is in a completely open position. In this condition, the cam follower 90 is engaged by the second control surface 68b such that the first switch 84 is closed. The cam follower 94, however, resides in the recess 92 such that the second switch 86 is open. Further, the cam follower 96 resides in a recess 98 provided on the third control surface 68c such that the third switch 88 is oriented to close contacts 88b and 88c.

In the baffle open condition, therefore, the fresh food thermostat 82 controls the operation of the evaporator fan 26. As described above, when the fresh food thermostat calls for additional cooling for the fresh food compartment, the baffle 12 is positioned in an open position. It can be understood, therefore, that whenever the baffle 12 is open, the evaporator fan is energized.

When the temperature in the fresh food compartment 22 moves below the desired fresh food temperature, the fresh food thermostat 82 opens contacts 82a and 82c and closes contacts 82a and 82b. Under this condition, the baffle motor 62 is energized through the first switch 84 which is in the closed position. Energization of the motor 62 causes the cam 68 to rotate, closing the second switch 86 and moving the slide door 44 from an open toward a closed position. As described above, 180 degree rotation of the cam 68 moves the baffle 12 from a completely open position to a completely closed position. In the completely closed position, the recess 92 provided on the second control surface 68b operates to open the first switch 84, thereby deenergizing the motor 62. Further, the third control surface drives the third switch 88 to close contacts 88a and 88b wherein the evaporator fan 26 is connected in series with the freezer thermostat 80.

With regard to temperature control of the freezer compartment 20, it can be understood from the above description that when the baffle 12 is in a closed position and the temperature in the freezer compartment 20 moves above the desired freezer temperature, the freezer thermostat 80 closes, energizing the compressor 39, condenser fan 41 and the evaporator fan 26. However, when the baffle 12 is open, the evaporator fan 26 is energized through the contacts of the fresh food thermostat 82. With the baffle 12 open, therefore, the freezer thermostat 80 operates to energize only the compressor 39 and the condenser fan 41.

Figure 8A:
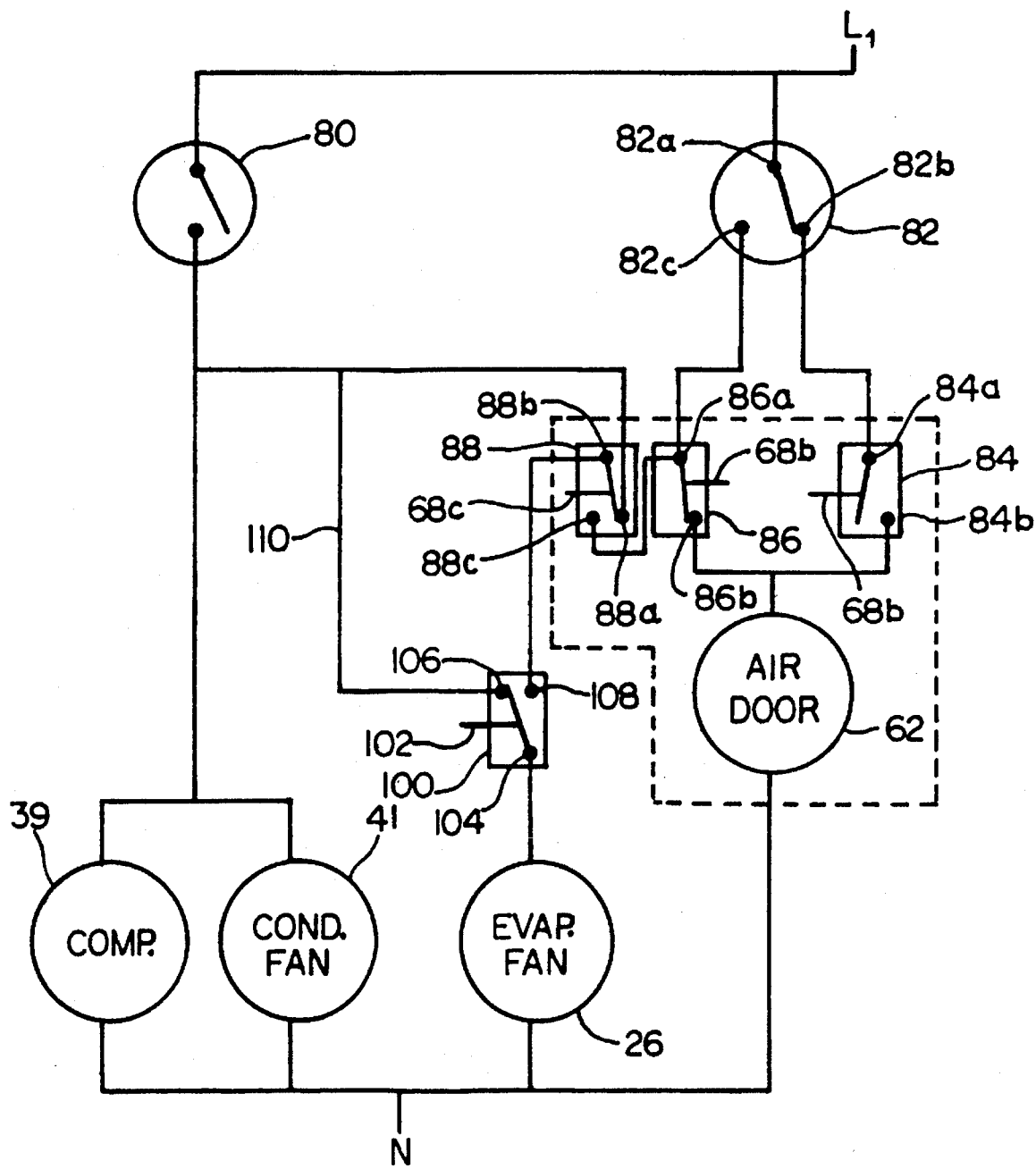
FIG. 8a is an alternative electrical schematic of an evaporator fan and baffle control system of the present invention, wherein the baffle is positioned in a closed position.

An alternative embodiment for the present invention is illustrated in FIG. 8a wherein switch 100 has been added for providing an additional control feature to the present invention. As contemplated by the inventors, switch 100 is disposed between switch 88 and the evaporator fan 26 and includes a manually operable control lever 102 which may be selectively positioned by the operator in either a first or second position. When the control lever 102 is positioned in the first position, switch 100 is oriented in an open position wherein a current path is provided through contacts 104 and 106. When the control lever 102 is positioned in the second position, switch 100 is oriented in a closed position wherein a current path is provided through contacts 104 and 108.

It can be understood by one skilled in the art, therefore, that in the open position switch 100 is oriented such that the current path through the fresh food thermostat 82 and the evaporator fan 26 is broken. With the switch 100 in the open position, when the fresh food thermostat 82 calls for cooling by closing contacts 82a and 82c, only the air door motor 62 is energized to open the baffle 12. The evaporator fan 26 remains deenergized. However, with switch 100 in the closed position, the energization of the evaporator fan 26 is controlled in a similar fashion as described for FIG. S.

Switch 100 is further provided with a by-pass wire 110 for connecting contact 106 in series with the freezer thermostat 80 such that a current path is established between the freezer thermostat 80 and the evaporator fan 26 when the switch 100 is in the open position. In this fashion, regardless of the orientation of the switch 88, when the freezer compartment 20 calls for cooling, the evaporator fan 26 will be energized.

It can be seen, therefore, that switch 100 allows the operator to selectively control the operation of the evaporator fan 26 when it is energized through the fresh food compartment 22.

Although the present invention has been described with reference to specific embodiments, those of skill in the Art will recognize that changes may be made thereto without departing from the scope and spirit of the invention as set forth in the appended claims. Although a specific embodiment of our invention may be for use in a side-by-side refrigerator, it may be easily understood that this invention may be applied in other refrigerator configurations.

We claim:

1. In a refrigerator having a cabinet defining a first compartment and a second compartment separated from each other by a divider wall, the divider wall having an air passage for communicating between said first and second compartments, said refrigerator further having an evaporator disposed in said first compartment, a compressor fluidly connected with said evaporator for moving refrigerant therethrough, and an evaporator fan for moving air over the evaporator wherein a power supply is selectively connectable to said compressor and evaporator, an evaporator fan control comprising:

a baffle positioned within said air passage and being positionable in either an open or closed position for selectively opening and closing said air passage;

a first thermostat for sensing temperature within said first compartment;

a second thermostat for sensing temperature within said second compartment;

a switch operatively associated with said baffle for connecting said first thermostat and said evaporator fan in series with said power supply when said baffle is in said closed position and connecting said second thermostat and said evaporator fan in series with said power supply when said baffle is in said open position.

2. The evaporator fan control according to claim 1, further wherein:

said baffle is positioned in said open position when said second thermostat indicates said second compartment requires cooling; and said baffle is positioned in said closed position when said second thermostat indicates said second compartment does not require cooling, whereby said switch operates such that the evaporator fan is energized when either the first compartment or the second compartment requires cooling.

3. The evaporator fan control according to claim 1, further comprising:

a motor;

a cam drivingly interconnected with said motor and coupled to said baffle such that rotation of said cam operates to selectively move said baffle to said open or closed position, said cam being further coupled to said switch such that rotation of said cam operates said switch.

4. The evaporator fan control according to claim 3, further comprising:

said cam further having a first control surface, a second control surface and a third control surface, wherein movement of said first control surface operates to position said baffle in said closed or open position;

a second switch operated by movement of said second control surface for selectively connecting said motor with said power source such that said baffle may be moved from said closed position to said open position when said second thermostat indicates said second compartment requires cooling;

a third switch operated by movement of said second control surface for selectively connecting said motor with said power source such that said baffle may be moved from said open position to said closed position when said second thermostat indicates said second compartment does not require cooling; and said switch being operated by movement of said third control surface.

5. The evaporator fan control according to claim 3, said baffle further comprising:
   a first plate having an aperture therethrough defining an opening through which refrigerated air may pass; and
   a second plate moveable relative to said first plate and including an aperture therethrough defining an opening through which refrigerated air may pass;
   wherein said cam operates to move said second plate relative to said first plate to position said openings in a preselected alignment to control the movement of refrigerated air through said passage.

6. The evaporator fan control according to claim 1, further comprising:
   a second switch positioned in series between said switch and said evaporator fan, said second switch being manually operable between an open position and a closed position wherein the current path between said second thermostat and said evaporator fan is broken when said second switch is in the open position.

7. The evaporator fan control according to claim 6, further comprising:
   a by-pass line connecting said second switch with said first thermostat such that a current path is established between said first thermostat and said evaporator fan when said second switch is in the open position.

8. In a refrigerator having a cabinet defining a first compartment and a second compartment separated from each other by a divider wall, air passage means for communicating between said compartment, heat exchanger means operable for selectively cooling said compartments, fan means for moving air over the heat exchanger means for assisting the transfer of thermal energy, a baffle and switch assembly comprising:
   baffle means positioned within said air passage means and indexable to selectively open and close said air passage means;
   a first thermostat for sensing temperature within said first compartment;
   a second thermostat for sensing temperature within said second compartment;
   switch means for connecting said first thermostat and said fan means in series with said power supply when said baffle is in said closed position and for connecting said second thermostat and said evaporator fan in series with said power supply when said baffle is in said open position.

9. The baffle and switch assembly according to claim 8, further wherein:
   said baffle means is positioned in said open position when said second thermostat indicates said second compartment requires cooling; and
   said baffle means is positioned in said closed position when said second thermostat indicates said second compartment does not require cooling,
   whereby said switch operates such that the evaporator fan is energized when either the first compartment or the second compartment requires cooling.

10. The baffle and switch assembly according to claim 8, further comprising:
    a motor;
    cam means drivingly interconnected with said motor and coupled to said baffle means such that rotation of said cam means operates to selectively move said baffle to said open or closed position, said cam means being further coupled to said switch means such that rotation of said cam means operates said switch means.

11. The baffle and switch assembly according to claim 10 further comprising:
    means for selectively connecting said motor with said power source such that said baffle may be moved from said closed position to said open position when said second thermostat indicates said second compartment requires cooling;
    means for selectively connecting said motor with said power source such that said baffle may be moved from said open position to said closed position when said second thermostat indicates said second compartment does not require cooling; and
    said switch means being operated by movement of said cam means.

12. The evaporator fan control according to claim 10, said baffle further comprising:
    a first plate having an aperture therethrough defining an opening through which refrigerated air may pass; and
    a second plate moveable relative to said first plate and including an aperture therethrough defining an opening through which refrigerated air may pass;
    wherein said cam operates to move said second plate relative to said first plate to position said openings in a preselected alignment to control the movement of refrigerated air through said passage.

13. The baffle and switch assembly according to claim 8, further comprising:
    means for selectively breaking the connection between said second thermostat and said evaporator fan such that said evaporator fan is only energized when said first thermostat calls for cooling of said first compartment.

14. In a refrigerator having a cabinet defining a first compartment and a second compartment separated from each other by a divider wall, the divider wall having an air passage for communicating between said first and second compartments, said refrigerator further having an evaporator disposed in said first compartment, a compressor fluidly connected with said evaporator for moving refrigerant therethrough, and an evaporator fan for moving air over the evaporator wherein a power supply is selectively connected to said compressor and evaporator, an evaporator fan control comprising:
    a baffle positioned within said air passage and being positionable in an open or closed position for selectively opening and closing said air passage;
    a motor;
    a cam drivingly interconnected with said motor and coupled to said baffle such that rotation of said cam operates to selectively move said baffle to said open or closed position;
    a first thermostat for sensing temperature within said first compartment;
    a second thermostat for sensing temperature within said second compartment;
    a first switch operatively associated with said cam for selectively connecting said motor with said power source such that said baffle may be moved from said closed position to said open position when said second thermostat indicates said second compartment requires cooling; a second switch operatively associated with said cam for selectively connecting said motor with said power source such that said baffle may be moved from said open position to said closed position when said second thermostat indicates said second compartment does not require cooling; and a third switch operatively associated with said cam for connecting said first thermostat and said evaporator fan in series with said power supply when said baffle is in said closed position and connecting said second thermostat and said evaporator fan in series with said power supply when said baffle is in said open position.

15. The evaporator fan control according to claim 14, further comprising:

a fourth switch positioned in series between said switch and said evaporator fan, said second switch being manually operable between an open position and a closed position wherein the current path between said second thermostat and said evaporator fan is broken when said second switch is in the open position.

16. The evaporator fan control according to claim 15, further comprising:

a by-pass line connecting said second switch with said first thermostat such that a current path is established between said first thermostat and said evaporator fan when said second switch is in the open position.

17. The evaporator fan control according to claim 14, further comprising:

said cam further having a first control surface, a second control surface and a third control surface, said first control surface operating to position said baffle in said closed or open position, said second control surface operating to close said first switch when said baffle is in said closed position and to open said first switch when said baffle is in said open position, said second control surface further operating to open said second switch when said baffle is in said closed position and to close said second switch when said baffle is in said open position, and said third control surface controlling said third switch such that said first thermostat and said evaporator fan are connected in series with said power supply when said baffle is in said closed position, and said second thermostat and said evaporator fan are connected in series with said power supply when said baffle is in said open position.

18. The evaporator fan control according to claim 17, said baffle further comprising: a first plate having an aperture therethrough defining an opening through which refrigerated air may pass; and a second plate moveable relative to said first plate and including an aperture therethrough defining an opening through which refrigerated air may pass;

wherein said cam operates to move said second plate relative to said first plate to position said openings in a preselected alignment to control the movement of refrigerated air through said passage.

\* \* \* \* \*